United States Patent
Fleming

(10) Patent No.: US 6,634,587 B2
(45) Date of Patent: Oct. 21, 2003

(54) FISHING REEL FISHING LINE RELEASE AND RETRIEVE MECHANISM

(76) Inventor: Keith V. Fleming, 1284 Quiet Cove Rd., Florien, LA (US) 71429

( * ) Notice: Subject to any disclaimer, the term of this patent is extended or adjusted under 35 U.S.C. 154(b) by 0 days.

(21) Appl. No.: 10/040,040

(22) Filed: Nov. 6, 2001

(65) Prior Publication Data

US 2003/0085312 A1 May 8, 2003

(51) Int. Cl.$^7$ .................. A01K 89/015; A01K 89/01
(52) U.S. Cl. .................. 242/255; 242/228; 242/230
(58) Field of Search .................. 242/227, 228, 242/255, 230

(56) References Cited

U.S. PATENT DOCUMENTS

| | | | | |
|---|---|---|---|---|
| 2,590,369 A | * | 3/1952 | Beeler | 242/228 |
| 4,154,414 A | * | 5/1979 | Shepherd | 242/230 |
| 4,166,591 A | * | 9/1979 | Shepherd | 242/230 |
| 4,436,254 A | * | 3/1984 | Normann | 242/228 |
| 4,725,013 A | | 2/1988 | Epperson | 242/231 |
| 4,892,267 A | * | 1/1990 | Webb | 242/228 |
| 5,368,246 A | | 11/1994 | Epperson | 242/228 |
| 6,032,892 A | * | 3/2000 | Epperson | 242/227 |

* cited by examiner

*Primary Examiner*—Kathy Matecki
*Assistant Examiner*—E Langdon

(57) ABSTRACT

In a fishing reel fishing line release and retrieve mechanism in which a projection is affixed to the periphery of a rotor in such a manner that the projection spans the periphery of a spools integral flanges and extends into a gap between the cylindrical formed periphery of a free rotating disk and the periphery of the outer spool flange, a mode for coiling fishing line onto the spool. Separating spool and disk from rotor to a distance the projection no longer extends into gap a mode for allowing fishing line to uncoil off of spool. A fishing reel fishing line release and retrieve mechanism having a rotor shaft and a spool shaft that rotate about the same axis and rotatable in the opposite directions simultaneously by a crank determining the fishing line retrieved to crank rotation ratio and having a mechanism to disengage spool shaft rotation during fishing line retrieve operation determining a second fishing line retrieved to crank rotation ratio.

3 Claims, 4 Drawing Sheets

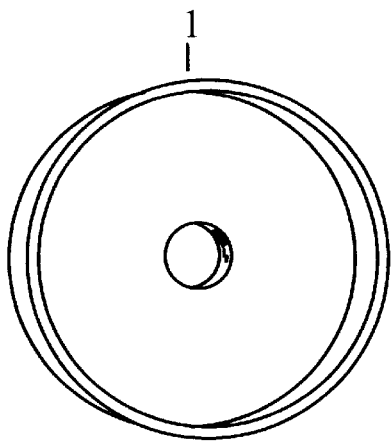
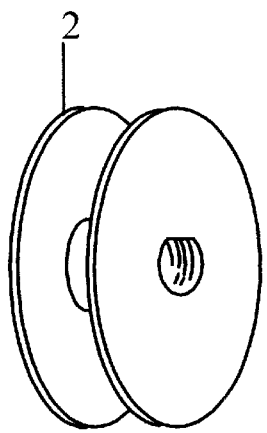
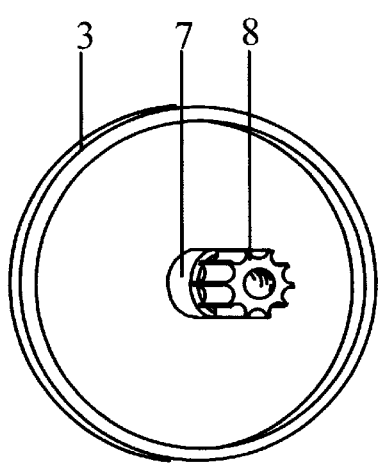
FIG. 4A  FIG. 5A  FIG. 6A
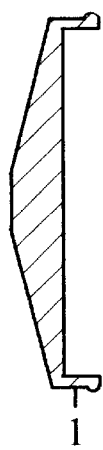
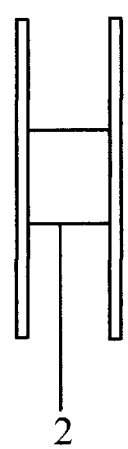
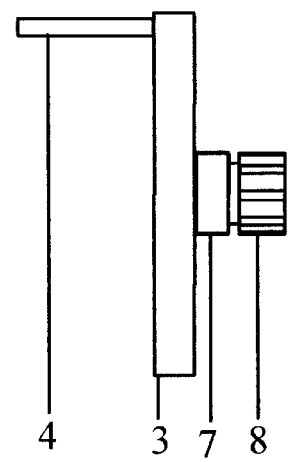
FIG. 4B  FIG. 5B  FIG. 6B
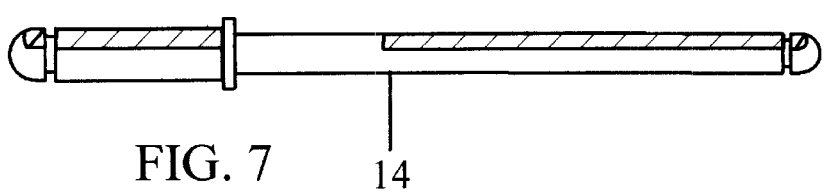
FIG. 7  FIG. 8A
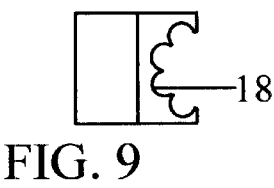
FIG. 9  FIG. 8B

FISHING REEL FISHING LINE RELEASE AND RETRIEVE MECHANISM

CROSS-REFERENCE TO RELATED APPLICATIONS

Not applicable.

FEDERALLY SPONSORED RESEARCH OR DEVELOPMENT

Not applicable.

1. Background—Field of Invention

This invention relates to fishing spinning reels.

2. Background—Description of Prior Art

A typical fishing spinning reel: A rotor with supporting arms on each side in which are pivotal points for a bail, a spool in which fishing line is coiled onto, a reel body housing, primary and secondary shafts, gears coupled to a crank. A typical fishing spinning reel has two primary modes of operation, fishing line release or fishing line retrieve. In operating the reel the bail is swung to a position that will allow the fishing line to uncoil while at the same time the operator has to physically hold the fishing line until a releasing point is reached. To retrieve the fishing line the operator turns the crank that mechanically returns bail to the retrieve position and continues turning crank coiling line onto spool. A typical fishing spinning reel has a fixed fishing line retrieve to crank rotation ratio and cannot be changed during operation.

The described typical fishing reel involves problems to be solved. The complexity and number of manufactured parts, the complexity of assembly, the complexity of operating a typical fishing spinning reel while lacking the capability of selecting different fishing line retrieve to crank rotation ratio.

SUMMARY OF INVENTION

In view of the foregoing, the objective of the invention is to provide a fishing reel fishing line release and retrieve mechanism that reduces the complexity and number of parts required, simplifies assembly, releases fishing line with a single urging action and returns to a fishing line retrieve position automatically while providing a mechanism for a fishing reel that has a selection of fishing line retrieve to crank ratio.

The foregoing object of the invention has been achieved by the provisions of a fishing reel release and retrieve mechanism in which the bail is eliminated and by affixing to the rotor a "projection" that spans across the periphery of the inter and outer spool flanges into a gap between a free rotating disk periphery that encompasses the outer spool flange periphery closing any route for the fishing line to uncoil. When a single urging action is applied to a shaft coupled to spool and supports disk in a direction that moves spool and disk away from rotor projection allowing fishing line to uncoil. When urging force is removed a spring automatically returns spool and disk to position projection spans spool flanges into gap closing off opening for fishing line to uncoil. Provision of a fishing reel fishing line release and retrieve mechanism in which the rotor has a affixed shaft and gear and the spool has a coupled shaft with a positional gear in which the rotor shaft gear and spool shaf gear rotate independently about the same axis and are rotatable about axis in opposite directions by a gear coupled to a crank, inturn when crank is rotated rotor and spool turn in opposite directions.

The provision of having rotor and spool rotate in opposite directions simultaneous both determine one fishing line retrieve to crank rotation ratio. The invention provides a second fishing line retrieve to crank rotation ratio when spool shaft gear is urged to a position it is not engaged with crank driven gear then the fishing line retrieve to crank rotation ratio is determined by rotor gear and crank driven gear only.

This inventions simplicity and novelty is accomplished by decreasing and reversing actions required by operator in releasing line from a fishing reel compared to what is typical.

DRAWING FIGURES

FIGS. 4A & 4B depicts a disk that is cylindrically formed at the periphery and a center smooth bore to allow disk to rotate freely about a shaft.

FIGS. 5A & 5B depicts a spool with integral flanges and a center cut mandrel to prevent spool from rotating freely about a shaft.

FIG. 6A depicts rotor with affixed rotor shaft and affixed rotor shaft gear all center smooth bored to allow free rotation about a shaft.

FIG. 6B depicts side view of items described in FIG. 6A with added inclusion of rotor projection.

FIG. 7 depicts a shaft comprising of two diameters with single cord oblate areas sized to accommodate associated receiving mandrels.

FIGS. 8A & 8B depicts spool shaft gear with a center cut mandrel to prevent gear from rotating freely about a shaft.

FIG. 9 depicts side view of cog formed to intermesh with a gear.

DETAILED DESCRIPTION OF THE PREFERRED EMBODIMENTS

Preferred embodiments of this invention will be described with reference to the accompaning drawings in detail.

Figure 1:
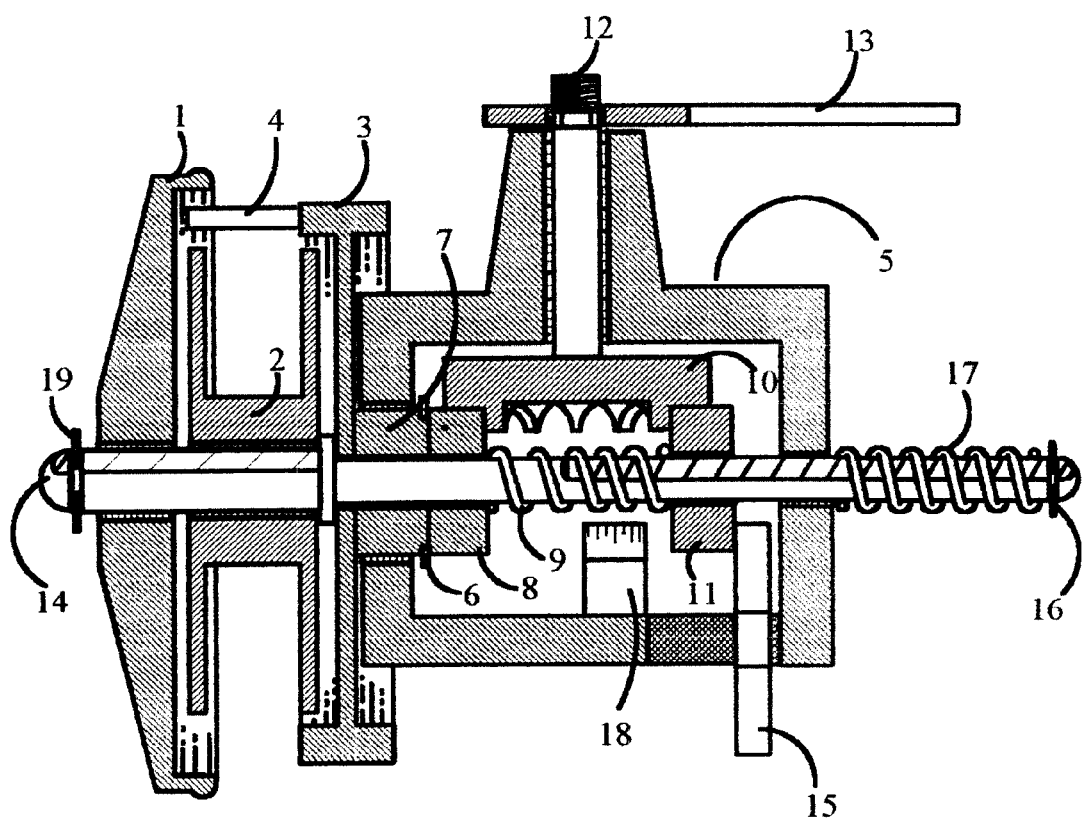
FIG. 1 is a item view of embodiment in a fishing line retrieve mode.

Embodiment as depicted in FIG. 1 is a fishing reel fishing line release and retrieve mechanism supported by reel body support 5. FIG. 1 depicts rotor projection 4 spanning spool 2 into a gap between spool 2 outer flange periphery and free rotating disk 1 having a cylindrically formed periphery that encompasses the spool 2 outside flange preventing fishing line from uncoiling off of spool 2.

Embodiment as depicted in FIG. 1 a mode forretrieving fishing line. A mode when crank 13 is rotated being coupled to crank shaft 12 and inturn to drive gear 10 rotates rotor shaft gear 8 and spool shaft gear 11 simultaneously rotating rotor 3 and rotor projection 4 one direction coiling fishing line onto spool 2 and rotating spool 2 the opposite direction winding fishing line onto spool 2.

Figure 2:
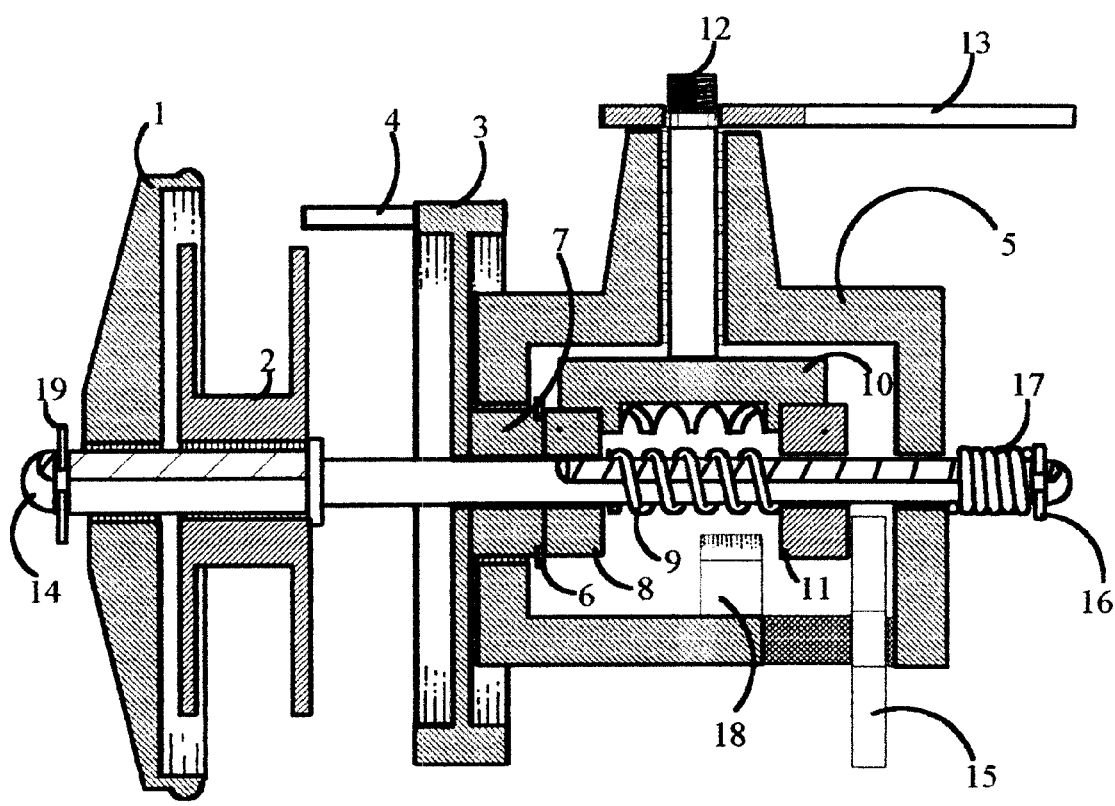
FIG. 2 is a item view of embodiment showing spool and disk in the forward position a fishing line release mode.

Embodiment as depicted in FIG. 2 is in a fishing line release mode. FIG. 2 depicts spool shaft 14 urged forward compressing spool shaft spring 17 while forcing spool 2 and disk 1 forward to a position rotor projection 4 does not span spool 2 flanges creating opening for fishing line to uncoil off of spool 2. When forward urging force is removed from spool shaft 14 spool shaft spring 17 returns spool shaft 14, spool 2 and disk 1 back to a fishing line retrieve mode as depicted in FIG. 1.

Figure 3:
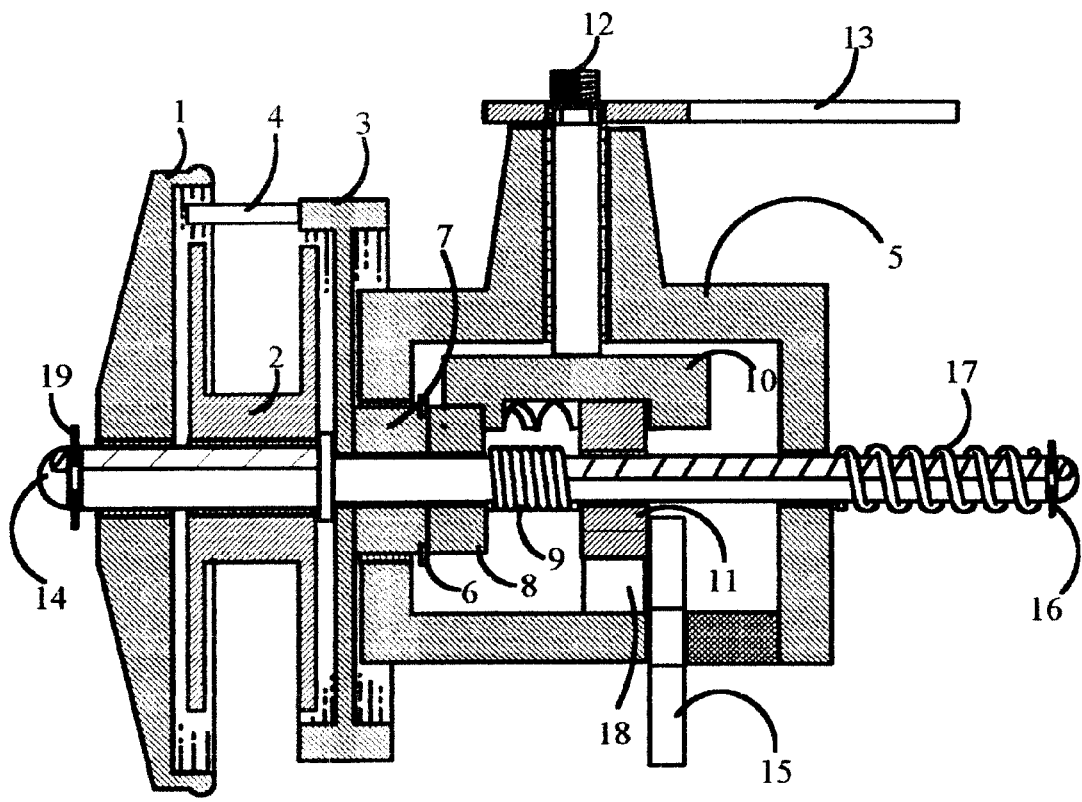
FIG. 3 is a item view of embodiment showing spool shaft gear disengaged from drive gear and intermeshingly engaged with cog a second fishing line retrieve to crank rotation ratio mode.

Embodiment as depicted in FIG. 3 depicts having the ratio slide bar 15 urged forward urging the slidable spool shaft gear 11 forward disengaging from drive gear 10 and intermeshingly engage with cog 18 preventing spool 2 from rotating. When the embodiment is in this mode the rotating of crank 13 only rotates the rotor 3 and does not rotate spool 2 being a second fishing line retrieve to crank rotation ratio. When urging force is removed from ratio slide bar 15 spool shaft spring 9 returns spool shaft gear 11 to primary fishing line retrieve to crank rotation ratio as depicted in FIG. 1.

Alternative Embodiments

1. Embodiment with ratio slide bar 15 eliminated.
2. Embodiment with ratio slide bar 15, spool shaft gear 11, and spool shaft spring 9 eliminated and changing reel body support 5 to prevent spool shaft 14 from rotating but allow spool shaft 14 to slide along its axis positioning spool 2 in fishing line retrieve or fishing line release mode.

What is claimed is:

1. A fishing reel fishing line release and retrieve mechanism comprising:

a reel body support, said reel body support having means of mounting and enclosing;

a spool, said spool with an integral flange on each end for storing retrieved fishing line between said flanges and said spool having an axis of rotation and being rotatable about said axis when retrieving fishing line;

a disk, said disk that is cylindrical formed at its periphery and rotates freely about said spool axis having a diameter larger than that of said spool and located adjacent to said spool providing a gap between said disk cylindrical formed periphery and adjacent spool flange;

a rotor, said rotor having an axis of rotation the same as said spool axis and being rotatable about said spool axis in opposite direction of said spool;

a rotor projection, said rotor projection affixed at the periphery of said rotor, said rotor projection projecting parallel to said spool axis and spans the width of said spool into gap between said disk cylindrical formed periphery and adjacent spool flange;

a rotor shaft, said rotor shaft is affixed to said rotor to rotate with said rotor, said rotor shaft having an axis of rotation the same as said rotor axis and being rotatable about said rotor shaft axis, said rotor shaft being extended through and supported by said reel body support;

a rotor shaft gear, said rotor shaft gear is affixed to said rotor shaft to rotate with said rotor shaft, said rotor shaft gear having an axis of rotation the same as said rotor shaft axis and being rotatable about said rotor shaft axis;

a spool shaft, said spool shaft having an axis of rotation the same as said spool axis and being rotatable and slidable on said axis, said spool shaft extends through said disk, said spool, said rotor, said rotor shaft, said rotor shaft gear and said reel body support, said spool shaft is an axle for said disk to rotate freely about, said spool shaft is coupled to said spool to transfer said spool shaft movement to said spool, when said spool shaft is absent of an urging force along its axis said rotor projection remains extended into gap between said disk cylindrical formed periphery and said spool outer flange a fishing line retrieve mode, when said spool shaft has an urging force applied along its axis urging said spool and said disk to where said rotor projection does not extend into gap fishing line is released;

a spool shaft spring, said spool shaft spring is coiled about and coupled to said spool shaft, in absence of an urging force said spool shaft spring positions said spool shaft to a fishing line retrieve mode;

a crank shaft, said crank shaft having an axis of rotation that crosses said rotor shaft and said spool shaft axis at a right angle and being rotatable about said crank shaft axis, said crank shaft extends through and supported by said reel body support;

a drive gear, said drive gear having an axis of rotation the same as said crank shaft and being rotatable about said crank shaft axis, said drive gear is coupled to said crank shaft, said drive gear is engaged with said rotor shaft gear;

a crank, said crank having an axis of rotation the same as said crank shaft and said drive gear axis and rotatable about said crank shaft axis, said crank coupled to said crank shaft rotates said drive gear, with said rotor shaft gear, said rotor shaft, said rotor and said rotor projection coiling fishing line onto said spool.

2. A fishing reel fishing line release and retrieve mechanism as defined in claim 1 comprising:

a spool shaft gear, said spool shaft gear having an axis of rotation the same as said spool shaft and being rotatable about said spool shaft axis, said spool shaft extends through said spool shaft gear, said spool shaft gear is slidable on said spool shaft, said spool shaft gear is coupled to said spool shaft, said spool shaft gear is intermeshingly engaged with said drive gear and when said drive gear is rotated by said crank said spool shaft gear being engaged with said drive gear rotates said spool shaft rotating said spool winding fishing line onto said spool while simultaneously said drive gear is intermeshingly engaged with said rotor shaft gear rotating said rotor shaft, said rotor and said rotor projection in opposite direction of said spool coiling fishing line onto said spool, having said spool and said rotor projection rotate simultaneously in opposite directions both said spool rotation and said rotor projection rotation determine in part the fishing line retrieved to crank rotation ratio.

3. A fishing reel fishing line release and retrieve mechanism as defined in claim 2 comprising:

a ratio slide bar, said ratio slide bar extends through slotted opening in said reel body support that allows said ratio slide bar to slide parallel to said spool shaft when urged by outside force, said ratio slide bar extends through slotted opening in said reel body support and abuts with rear area of said spool shaft gear, when said ratio slide bar is urged forward from outside force said spool shaft gear is urged forward along said spool shaft disengaging intermeshingly from said drive gear, with said spool shaft gear disengaged from said drive gear and having said rotor shaft gear remaining intermeshingly engaged with said drive gear, said crank when rotated only rotates said rotor shaft gear, said rotor shaft, said rotor and said rotor projection a decreased fishing line retrieved to crank rotation ratio;

a spool shaft gear spring, said spool shaft gear spring is coiled about said spool shaft opposing urging force from said spool shaft gear when urging force is applied to said ratio slide bar and returns said spool shaft gear and said ratio slide bar to the increased fishing line retrieved to crank rotation ratio when urging force is removed;

a cog, said cog is mounted on said reel body support, said cog is not rotatable and located to be intermeshingly engaged with said spool shaft gear when said spool shaft gear is disposed forward in the decreased fishing line retrieved to crank rotation ratio mode to prevent said spool from rotating freely while in the decreased fishing line retrieved to crank rotation ratio mode.

* * * * *